United States Patent
De Luca et al.

(10) Patent No.: US 10,458,394 B2
(45) Date of Patent: Oct. 29, 2019

(54) TURBINE WITH FLOW DIVERTER AND FLOW DIVERTER FOR TURBINES

(71) Applicant: MEDITERRANEAN DESIGN NETWORK S.R.L., Palermo (IT)

(72) Inventors: Marcello De Luca, Palermo (IT); Giovanni Ingrassia, Vicenza (IT)

(73) Assignee: MEDITERRANEAN DESIGN NETWORK S.R.L., Palermo (IT)

( * ) Notice: Subject to any disclaimer, the term of this patent is extended or adjusted under 35 U.S.C. 154(b) by 292 days.

(21) Appl. No.: 15/516,681

(22) PCT Filed: Oct. 16, 2015

(86) PCT No.: PCT/IB2015/057970
§ 371 (c)(1),
(2) Date: Apr. 4, 2017

(87) PCT Pub. No.: WO2016/059612
PCT Pub. Date: Apr. 21, 2016

(65) Prior Publication Data
US 2017/0292496 A1 Oct. 12, 2017

(30) Foreign Application Priority Data

Oct. 16, 2014 (IT) ............................... VI2014A0272

(51) Int. Cl.
*F03D 9/37* (2016.01)
*F03D 3/04* (2006.01)
(Continued)

(52) U.S. Cl.
CPC ............. *F03D 9/37* (2016.05); *F03D 3/005* (2013.01); *F03D 3/0454* (2013.01); *F03D 3/061* (2013.01);
(Continued)

(58) Field of Classification Search
CPC . F03D 9/37; F03D 3/061; F03D 3/005; F03D 3/0454; F03D 9/45; F03D 3/04;
(Continued)

(56) References Cited

U.S. PATENT DOCUMENTS

| 5,083,899 A | * | 1/1992 | Koch ................... F03D 3/0481 |
| | | | 415/2.1 |
| 9,371,818 B1 | * | 6/2016 | Monto ................. F03D 3/0427 |
| | | (Continued) | |

FOREIGN PATENT DOCUMENTS

| EP | 2469078 A2 * | 6/2012 | ............. F03D 3/002 |
| EP | 2821644 A1 * | 1/2015 | ............. F03D 3/002 |
| | (Continued) | | |

*Primary Examiner* — J. Todd Newton
(74) *Attorney, Agent, or Firm* — Mark M. Friedman (57) ABSTRACT

A turbine with flow diverter comprises a support frame adapted to be anchored to a fixed or movable structure, an impeller rotatably mounted about a rotation axis to the support frame and having a front inlet section for receiving the flow and adapted to move continuously upon the rotation produced by the flow between a pushing position and an advancing position in correspondence of the front section, a main flow diverter adapted to be anchored to the support frame and having a peripheral wall adapted to at least partially blind the front section with respect to the flow auxiliary diverter extending from a first section facing one or more blades in the advancing position to a second section facing one or more blades in pushing position. The auxiliary diverter comprises curvilinear conduits in reciprocal side by side position along a radial direction.

14 Claims, 9 Drawing Sheets

(51) Int. Cl.
*F03G 6/02* (2006.01)
*F03G 6/04* (2006.01)
*F03D 9/45* (2016.01)
*F03D 3/00* (2006.01)
*F03D 3/06* (2006.01)
*F24S 10/30* (2018.01)

(52) U.S. Cl.
CPC ................ *F03D 9/45* (2016.05); *F03G 6/02* (2013.01); *F03G 6/04* (2013.01); *F03G 6/045* (2013.01); *F03D 3/04* (2013.01); F05B 2210/16 (2013.01); F05B 2220/602 (2013.01); F05B 2240/13 (2013.01); F05B 2240/212 (2013.01); F05B 2240/213 (2013.01); F05B 2240/9112 (2013.01); F24S 10/30 (2018.05); Y02B 10/30 (2013.01); Y02B 10/70 (2013.01); Y02E 10/465 (2013.01); Y02E 10/728 (2013.01); Y02E 10/74 (2013.01)

(58) Field of Classification Search
CPC ..... F03D 9/35; F03D 9/39; F03D 9/41; F03D 9/43; F03D 9/46; F03D 9/0427; F03D 3/0427; F03D 3/0436; F03D 3/0445; F03D 3/0463; F03D 3/0472; F03D 3/0481; F03D 3/049; F03G 6/04; F03G 6/02; F03G 6/045; Y02B 10/70; Y02B 10/30; Y02E 10/465; Y02E 10/728; Y02E 10/74; F05B 2240/213; F05B 2240/9112; F05B 40/212; F05B 2220/602; F05B 2210/16; F05B 2240/13; F24S 10/30
USPC ........................................................ 415/4.1
See application file for complete search history.

(56) References Cited

U.S. PATENT DOCUMENTS

| | | | |
|---|---|---|---|
| 10,233,901 B2* | 3/2019 | Tay | F03B 17/062 |
| 2003/0133782 A1* | 7/2003 | Holter | F03D 3/005 |
| | | | 415/4.2 |
| 2004/0012207 A1* | 1/2004 | Nagy | F03D 3/0463 |
| | | | 290/55 |
| 2004/0108679 A1* | 6/2004 | Hayes | B60K 16/00 |
| | | | 280/213 |
| 2010/0074743 A1* | 3/2010 | Jairazbhoy | F03D 3/04 |
| | | | 415/208.1 |
| 2011/0070066 A1* | 3/2011 | Cumings | F03D 3/02 |
| | | | 415/1 |

FOREIGN PATENT DOCUMENTS

| | | | | |
|---|---|---|---|---|
| EP | 3249215 A1 | * | 11/2017 | ............ F03B 17/063 |
| FR | 2453287 A1 | * | 10/1980 | ............... F03D 3/04 |
| GB | 210937 A | * | 2/1924 | .......... F03D 3/0418 |
| WO | WO-2015168817 A1 | * | 11/2015 | ............... F03D 3/00 |

\* cited by examiner

TURBINE WITH FLOW DIVERTER AND FLOW DIVERTER FOR TURBINES

TECHNICAL FIELD

The present invention relates with the technical field of device for energy recovering from renewable sources and in particular with a turbine, either for wind application or for uses with water or other liquids or fluids, provided with a flow diverter for accelerating the flow and increasing the torque. The invention also relates with a flow diverter adapted to be coupled with a turbine.

STATE OF THE ART

In the context of micro-wind applications use of vertical axis turbines is increasingly common as this solutions allow to obtain powers which, although not high, however, are sufficient to cover at least part of the average energy needs for houses or commercial and industrial structures, while maintaining a small encumbrance.

In this field various models of turbines are known which differ generally with each other for the number and the shape of the blades but which normally consist of a rotating body rotatably mounted on a fixed support and connected to an electric generator.

In turn, the rotating body comprises a central shaft connected to the shaft of the generator, or defining such a shaft, and provided with two or more blades having a shaped profile, typically helical-shaped with a vertical extension axis, to intercept the wind and bring into rotation the entire body.

Daniels and Savonius turbines are a very common type of turbines, with the latter comprising two or more blades with a same section to ensure a periodic behavior during rotation.

The blades are shaped so that in a certain torque range each of them is alternately in an advancing condition with respect to the flow and then in a pushing or return phase.

The use of this kind of blades is favored, beside a relative cheapness, also by the reduced size, by the limited noise level and by the low inrush power, so that there is appreciable power production even with low wind.

However, the known micro wind turbines are characterized by low efficiency, for example between 0.10 and 0.15 for the common blades of Savonius type.

New solutions mainly aim to optimize the features of the blades, trying to increase the aerodynamic efficiency thereof, although, as demonstrated in theory; there is a maximum limit of power that can be extracted from the wind, once speed and the front surface of the turbine have been set.

To overcome these drawbacks it is then thought to associate a diverter having obstacle function to the impeller, at the section in which the blades are in the return position.

This diverter has the aim of reducing the pressures acting on the blade in the return position, thereby increasing the overall torque given by the difference between the moment acting on the advancing blade and the one acting on the returning blade.

Examples of such solutions are described in Mohamed et al., "Optimal blade shape of a modified Savonius turbines using an obstacle shielding the returning blade" and in Mohamed et al., "Optimization of Savonius turbines using an obstacle shielding the returning blade". These solutions, while providing a general improvement in performance, with values of output power up to 30% higher than the average values of traditional Savonius turbines, however, are not yet satisfactory and proved to be improvable.

US2011/0006542 discloses a Savonius type turbine that in some particular embodiments is associated with a flow diverter placed peripherally to the turbine so as to rotate freely with respect thereto.

The diverter has a conveying duct the flow towards the advancing blade, which duct being shaped so as to converge towards the turbine and produce dose to the impeller a narrowing adapted to accelerate the flow.

In particular, in a first configuration the conveying duct is delimited on one side by a converging flat wall Which ends with a concave area positioned in such a manner to be tangent to the ideal circumference defined by the advancing blade.

From the opposite side, the duct has a concave wall shaped so as to define a cusp point with the structure of the turbine and to have the tangent line in correspondence of its end substantially orthogonal to the input direction of the flow.

In a second embodiment, the concave wall is replaced by a further flat wall converging towards the inlet section.

The main drawback of both such embodiments is represented by the fact that the input flow impacts against the walls of the diverter in a not gradual manner, so as to define areas of compression of the fluid that involve the reduction of its kinetic energy, also creating microturbulence phenomena reducing the efficiency thereof.

A further drawback is represented by the fact that the diverter covers entirely the advancing blade, preventing to exploit the action of the incoming flow on the same advancing blade to further increase the torque.

Still another drawback is the presence, in some embodiments, of a full area that defines a real aerodynamic brake for the blade, as well as the presence of a rear extension which is also not positive.

GB2475843 discloses a wind turbine with horizontal axis in which the impeller is partly enveloped by a semicylindrical stator that allows to convey the flow not intercepted by the blade in the pushing position to bring it back towards the advancing blade.

This solution seems to be ineffective due to the loss of lift caused by the impact of the fluid with the wall of the stator.

SCOPE OF THE INVENTION

The object of the present invention is to overcome the above drawbacks, by providing a turbine with flow diverter having properties of high efficiency and relative cheapness.

A particular object is to provide a turbine which is particularly efficient, reliable and durable and which has reduced dimensions to be used in applications micro wind, micro hydro and other applications, in particular non-industrial applications.

A particular object is to provide a turbine provided with a flow diverter which allows to shift the operating speed of the turbine at higher spin numbers and with higher power coefficients. Still another object is to provide a turbine provided with flow diverter which allows to recover also the flow rejected from the advancing blade to redirect it to the pushing blade, so as to further increase the turbine efficiency even with relatively small flow rates.

Still another object is to provide a flow diverter for turbines that allows to increase the spin number of the turbine without using a gearbox, thus simplifying the generator-blade assembly and reducing the costs of manufacture and maintenance.

A particular object is to provide a flow diverter for turbines which allows to reduce the minimum starting speed of the turbine.

A particular object is to provide a flow diverter which can be coupled to any type of turbine, such as wind turbines or turbine for micro wind applications such as vertical axis turbines or turbines for water applications or for micro hydro applications or even for use within fluid currents, which allows to increase the overall efficiency of the turbine which it is associated to.

Still another object is to provide a flow diverter for turbines which allows to modify an existing turbine to increase the efficiency thereof and obtain a particularly advantageous power/cost ratio.

These objects, as well as others which will appear more clearly hereinafter, are achieved by a turbine with flow diverter which, according to claim 1, comprises a supporting frame adapted to be anchored to a fixed or movable structure, an impeller rotatably mounted about an axis of rotation on said support frame and having a inlet front section for the flow and a plurality of blades adapted to move in a continuous manner following rotation produced by the flow between a pushing position and an advancing position in correspondence of said front section, a main flow diverter adapted to be anchored to said support frame and having a peripheral wall adapted to occlude at least partially said front section with respect to the flow, an auxiliary diverter which extends from a first section facing to the one or more blades of said plurality in said advancing position to a second section facing to the one or more blades of said plurality into said pushing position.

The auxiliary diverter comprises a plurality of substantially curvilinear conduits mutually side by side along a substantially radial direction, each of said conduits having a first open end facing the blades of said plurality in the advancing position and a second open end positioned in correspondence of said conveying duct.

This combination of features, in addition to the increasing of the torque produced by the fluid incoming from the main diverter will give an additional contribution from the stream sent to the blades through the auxiliary diverter.

In a first configuration, said curvilinear conduits will be adapted to return at least partially the working fluid from said first inlet section for the fluid to said second output section to allow the entry of the flow returning from the advancing blades through said first ends and its transmission to said pushing blades through said second ends so as to increase the torque produced by the flow of said impeller.

This will make it possible to recover at least part of the flow sent to the blades and take advantage of the movement of the advancing blades to generate additional flow to be directed to the pushing blades.

The curvilinear shape of the return conduits will also allow to reduce turbulence phenomena inside the auxiliary diverter, increasing the output speed of the fluid from each conduit.

According to an alternative embodiment said curvilinear conduits may be adapted to allow the entry of fluid from said second section and its transmission to said blades in advancing position through said first section and said first ends.

In this way it will be possible to conduct the fluid directly impacting the blade not only to the blades in the pushing position but also to advancing ones, avoiding the presence of sections of the impeller with passive behavior.

Conveniently, the turbine may comprise a side conveyor opposite to said auxiliary diverter with respect to said main diverter and having an output facing the respective blades in the advancing position.

In this way, the fluid will be conducted on a high number of advancing blades, resulting in further increase of the torque and therefore of the producible power.

Advantageously, the conveying conduit will be converging towards an outlet port to restrict the passage section of the flow towards said impeller and increase the speed of the fluid. Furthermore, said conveying duct may comprise a first and a second side deflection wall facing with each other and converging towards an outlet port.

Said first wall may be substantially flat or slightly concave, while said second wall may have convexity directed towards the inside or the outside with an output edge radially offset and decentralized with respect to said axis of rotation to allow the incoming flow to invest at least partly also the blade in advancing position.

The specific configuration of the conveyor duct will avoid excessive impact zones for the fluid could generate causing loss of kinetic energy due to compression with possible onset of turbulent regime.

On the contrary, the presence of a curved profile for the deflection wall allows to accompany the flow towards the advancing blade, eliminating any single point of cusp between the profile of the deflection wall and the profile of the blade and eliminating areas in which in the turbine of the state of the art compression areas of the fluid are created at the wall with the possibility of formation of turbulent motions.

The positioning of the deflection wall not aligned with the center of rotation of the blades and radially offset with respect to the impeller so as to uncover a part of the advancing blade allows to have a pull effect on the advancing blade, resulting in further increase of torque. It is noted that a flow diverter provided with a conveying duct having this particular configuration may be advantageously realized also without the presence of the auxiliary diverter.

According to a further aspect of the invention there is provided a flow diverter of the type described above and having means for rotatably connection to a turbine.

In this way it will be possible to connect the flow diverter provided with the conveying duct and/or the auxiliary diverter according to the present invention to any preexisting turbine, so as to modify and increase the power/cost ratio thereof.

Advantageous forms of the invention are obtained according to the dependent claims.

BRIEF DISCLOSURE OF THE DRAWING

Further features and advantages of the invention will become more apparent in light of the detailed description of some preferred but not exclusive embodiments of a turbine with flow diverter according to the invention, illustrated by way of non-limiting examples with the aid of the accompanying drawings, wherein.

BEST MODES OF CARRYING OUT THE INVENTION

With reference to the accompanying figures a turbine provided with flow diverter is shown, which turbine according to a first type of application may be used in a preferred but not limiting way in home applications or in small premises for commercial and industrial uses, in particular for micro wind or micro hydro applications.

However, the turbine according to the present invention may also find application by immersion within pipelines or water conduits and in systems for the energy recovery from either rivers or marine currents, tidal power and the like, as will also be explained hereinafter.

Figure 1:
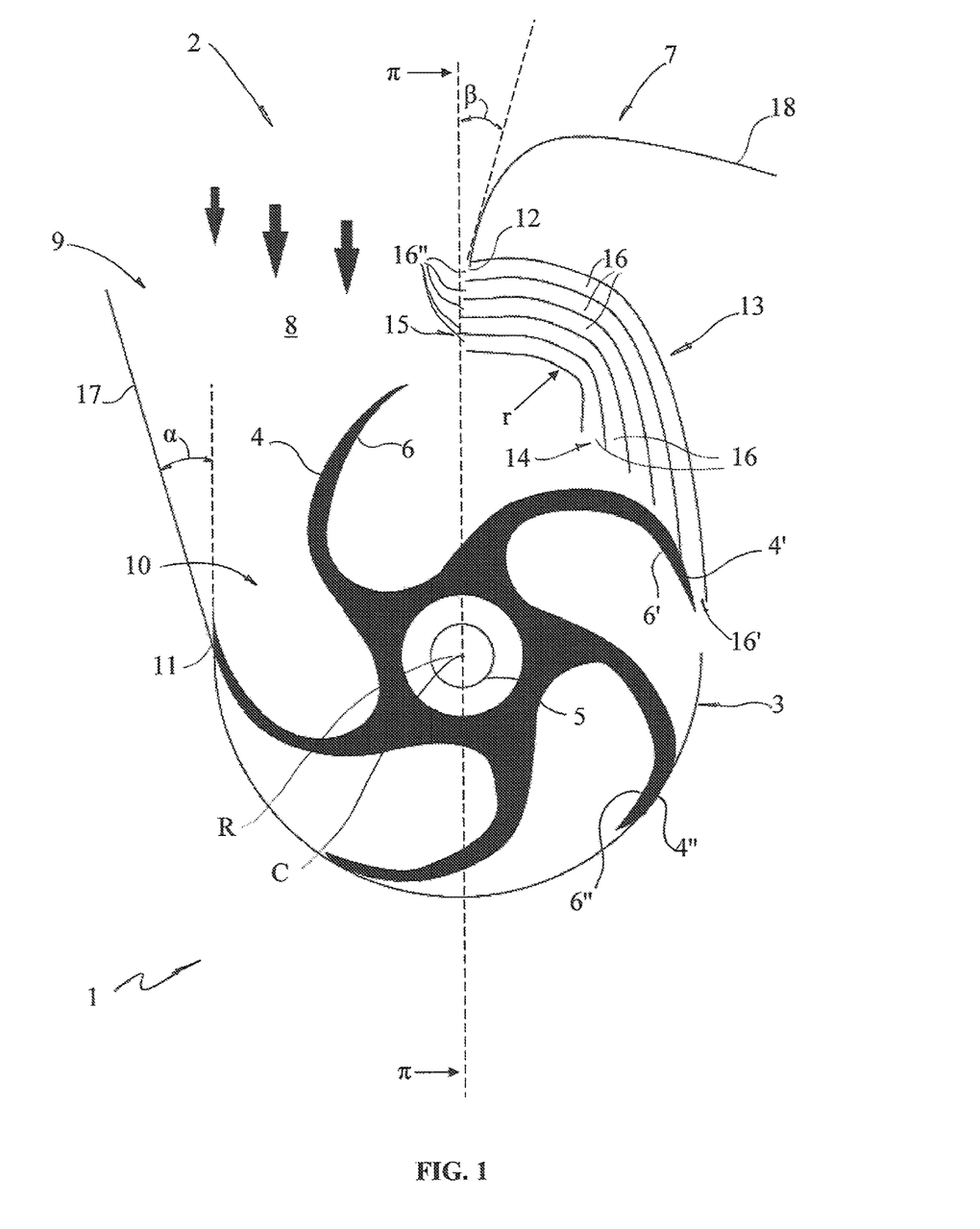
FIG. 1 is a schematic cross-sectional view of a turbine of the invention in a first preferred embodiment.

FIG. 1 schematically illustrates a first preferred but not exclusive configuration of a turbine according to the invention, generally indicated by 1, which essentially comprises a main flow diverter 2 and an impeller 3 rotatably mounted around a central axis of rotation R on a support frame, not shown in this figure, which can be anchored in turn to a fixed or movable structure, also not illustrated.

In a known manner, the impeller 3 will have a plurality of blades 4, 4', 4", 4''' integral with each other to rotate upon the action of the fluid so that from time to time at least one blade 4 is in the pushing position with respect to a front section designed for the entering of the flow, i.e. in the position in which it is invested by the main flow (whose feed direction is indicated by arrows) to produce the rotation of the central axis R.

At the same time one or more additional blades 4' will be in an advancing position, i.e., in a position in which they are not directly hit by the main flow.

The blades 4, 4', 4", 4''' may be mutually separated or defined by a suitably shaped single body with a central stem 5 defining the axis of rotation R and from which the concave surfaces 6, 6', 6", 6''' which the flow acts on in the pushing phase extend, to generate a torque adapted to produce the rotation of the impeller 3.

The flow diverter 2 will be anchored in a fixed or removable manner to the support frame by means of suitable connection means, also not shown in this figure.

In a particular configuration, the connection means will be of the rotary type to allow the rotation of the diverter 2 around a central axis C coaxial to the axis of rotation R of the impeller 3 in an independent manner with respect to the latter.

For some applications, such as in the case in which the turbine 1 operates by immersion in water pipes, for example in so-called mini-hydro applications, the diverter 2 may be connected to the frame of the turbine 1 or directly to an outer support structure in a fixed manner, so as to intercept the current always according to the main direction of flow.

The diverter 2 will comprise a supporting frame, not illustrated, which will be provided with the aforesaid connecting means, possibly of the rotary type, as well as a peripheral wall 7 which extends peripherally to the impeller 3 so as to at least partially occlude the front section.

Preferably, the side wall 7 will have axial extension greater than the axial dimension of the blades 4, 4', 4", 4''' of the impeller 3 to allow the accelerated current to invest completely these latter and ensure a uniform effect over the entire axial development of the impeller 3. The peripheral wall 7 comprises a main conveying conduit 8 adapted to convey the working fluid toward the impeller 3. The main duct 8 has an outer inlet port 9 for the fluid and an inner outlet port 10 facing the blade 4 of the impeller 3 which in turn is located in the pushing position for sending the accelerated flow thereto.

The main conveying duct 8 will extend preferably for the whole axial development of the peripheral wall 7 and will have edges 11, 12 facing one another and converging towards the central axis C to restrict the passage section of the flow towards the blades 4 of the impeller 3 and to increase the speed thereof and consequently the spin number.

In the case in which means are provided for rotatable and independent connection, such means may be suitably designed to allow the diverter 2 to remain always in the optimum position of operation, corresponding to the position in which the outlet section 10 of the flow is frontal and axially aligned with respect to the primary direction of the flow, to have always maximum flow of the fluid toward the impeller 3.

The remaining part of the peripheral wall 7 may be partially or totally closed or totally open, as illustrated in the figures.

The flow diverter 2 also comprises an auxiliary diverter 13 that extends from an inlet section 14 which faces the advancing blade 4' to an outlet section 15 in fluid communication with the main conveying duct 8.

In this first configuration, the auxiliary diverter 13 is adapted to return at least partially the working fluid hitting the advancing blade 4' toward the blade 4 in the pushing position in order to exploit a greater amount of fluid and further increase the torque produced by the flow on the impeller 3.

The auxiliary diverter 13 is suitably formed by a plurality of return conduits of the flow, generally indicated by 16, each having a first open end 16' facing the blade 4' in the advancing position and able to allow the entrance of the flow returning from the same blade 4' and a second open end 16" placed in correspondence of the main conveying conduit 8. Then, the second open ends 16" of the curvilinear conduits 16 will be suitable to bring the fluid back to the main conveying duct 8 in order to return on the blades in the pushing position 4.

The return conduits 16 are substantially curvilinear, mutually side by side along a direction substantially radial and preferably narrowing towards the outlet section 15 to increase the speed of the flow.

The radius of curvature r of the conduits 16 may have any values without any particular limitations and is preferably not too narrow, with central angles greater than 45° to avoid the occurrence of phenomena of compression of the fluid with possible onset of turbulent motion. From the same FIG. 1 it is observed that the main conveying duct 8 comprises a first side wall 17 and a second deflection side wall 18 facing each other and converging towards the outlet port 10, so as to obtain the acceleration of the flow.

The first wall 17 is substantially flat with a maximum angle α with respect to a median plane π passing through the central axis C and substantially parallel to the input direction of the main flow between 10° and 35°, so as to not create compression zones of the fluid.

In turn, the second wall 18 has convexity directed outwards and angle β reduced in correspondence with its outlet edge 12, again in order to avoid compression of the fluid. Moreover, the outlet edge 12 of the second wall 18 will be radially staggered and offset from the axis of rotation R so that the outlet port 10 of the main conveying duct 8 is wider than the radius of the impeller 3 to allow the flow entering the impeller 3 to invest at least partially also the blade 4' in the advancing position.

Figure 2:
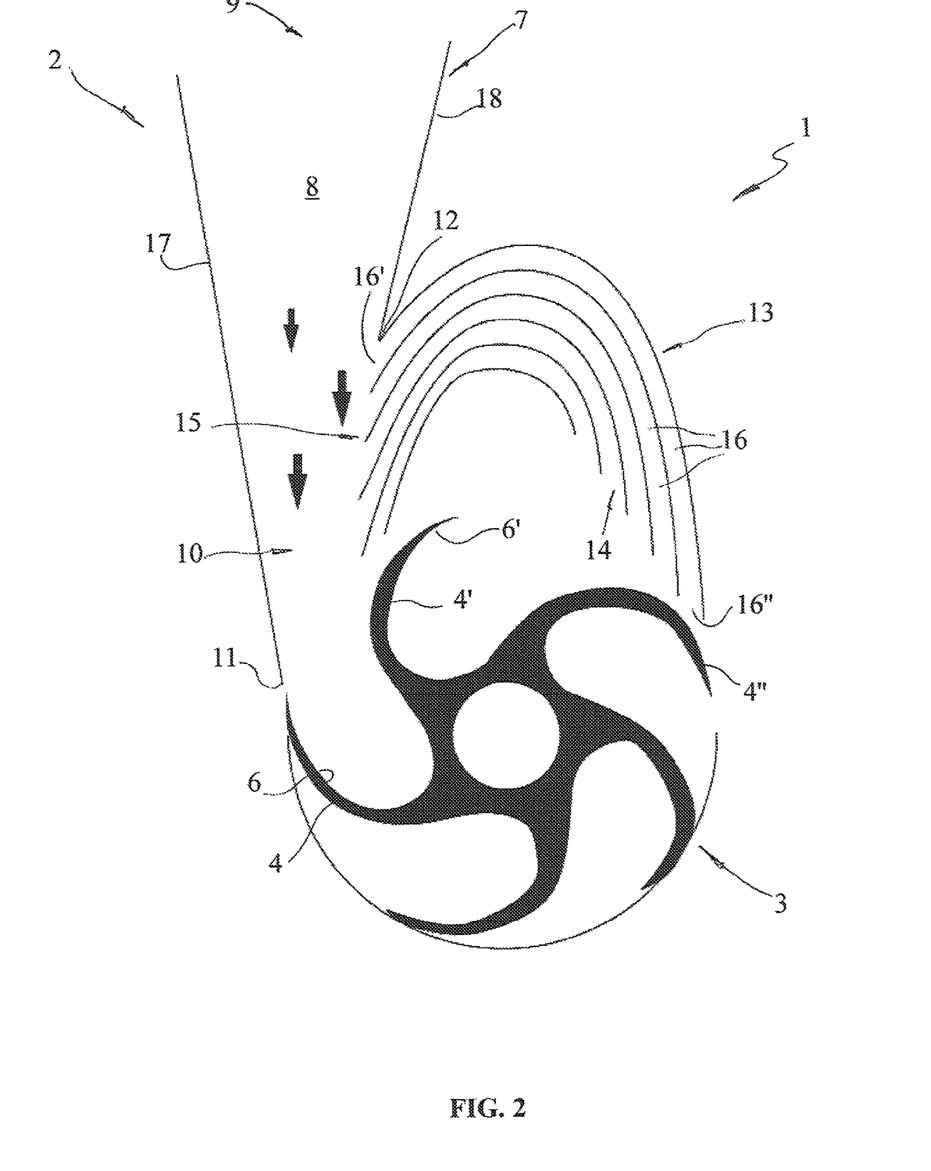
FIG. 2 is a schematic cross-sectional view of a first variant of the turbine of FIG. 1.

FIG. 2 shows a particular variant of the turbine 1 of FIG. 1, wherein the main conveying duct 8 has a greater convergence to define a greater narrowing and increase the effect of acceleration of the flow, with the return ducts 16 which in turn show a more accentuated curvature.

In both variants illustrated above it is observed that the output sections 15 of the return conduits 16 are in fluid communication with the conveying conduit 8.

In particular, the second ends 16" of the curvilinear conduits 16 are open directly into the conveying duct 8.

Figure 3:
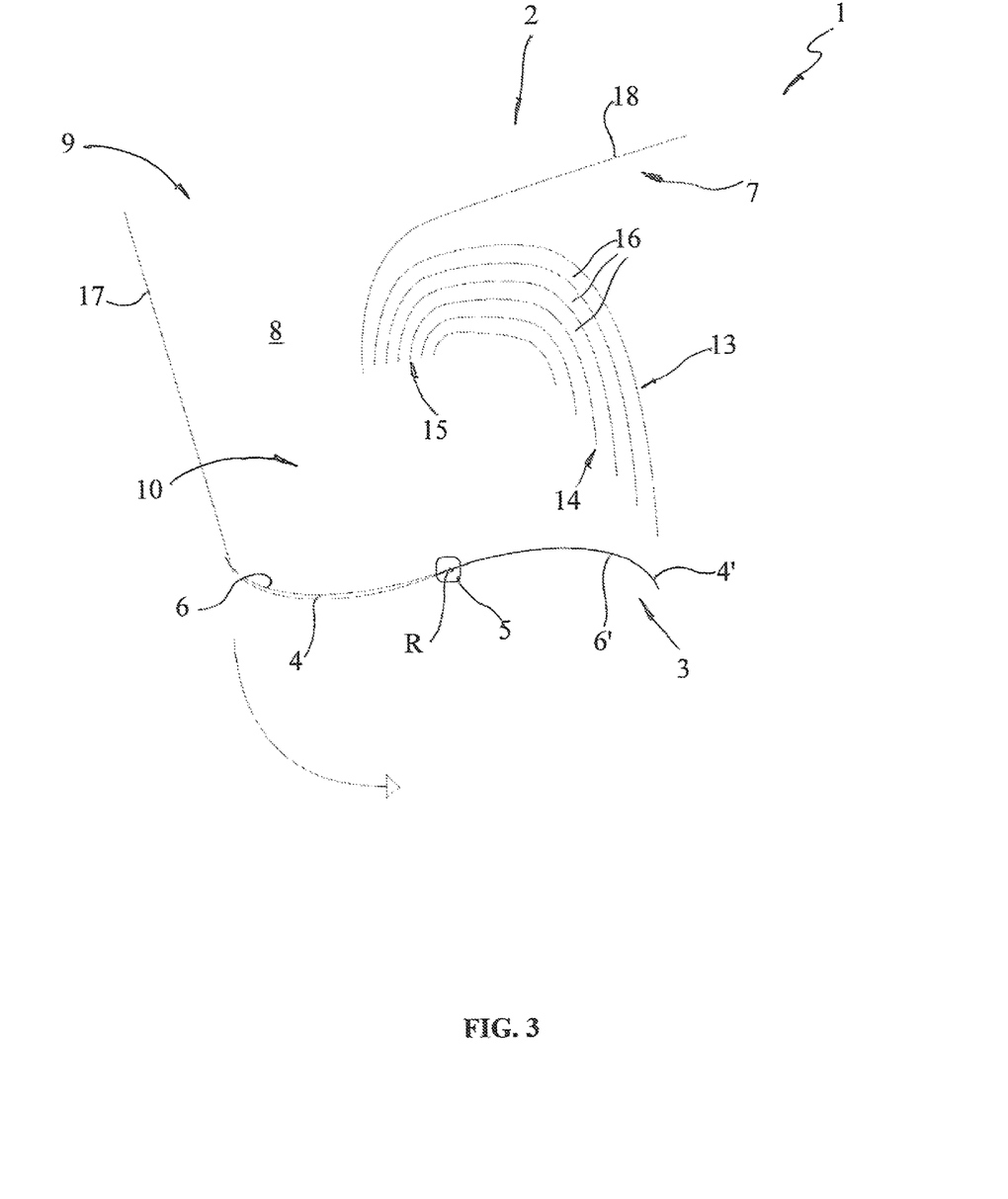
FIG. 3 is a schematic cross-sectional view of a second variant of the turbine of FIG. 1.

FIG. 3 shows a second variant of the turbine 1 described above, but differs from it, as well as for the shape of the impeller 3, however not limiting for the scope of protection of the present invention, for a different form of the return conduits 16 which define the auxiliary diverter 13, now having a double curvature.

In this configuration the auxiliary diverter 13, and consequently the return conduits 16, are not placed directly in fluid communication with the main conveying duct 8 but its output section 15, defined by the second open ends 16" of the conduit 16, faces the blade 4 in the pushing position to send the recovered flow directly thereto keeping them substantially separated from the main flow.

Furthermore, the second deflection side wall 18 entirely covers the blade 4' in the advancing position.

Figure 4:
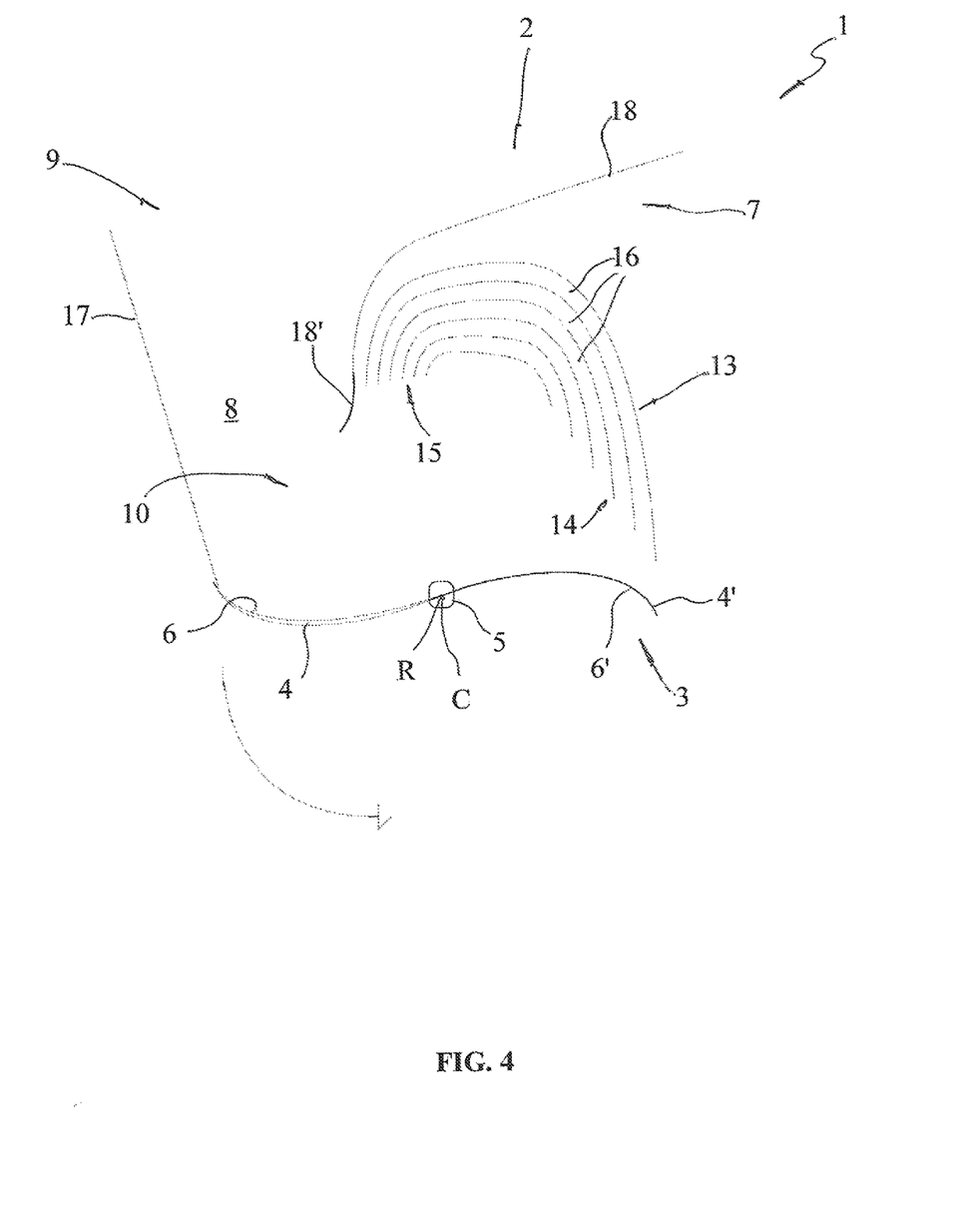
FIG. 4 is a schematic cross-sectional view of a third variant of the turbine of FIG. 1.

FIG. 4 shows a variant of the previous configuration in which the second side wall 18 has an end portion 18' outwardly concave to divert the main flow and facilitate the entry of side flows.

Figure 5:
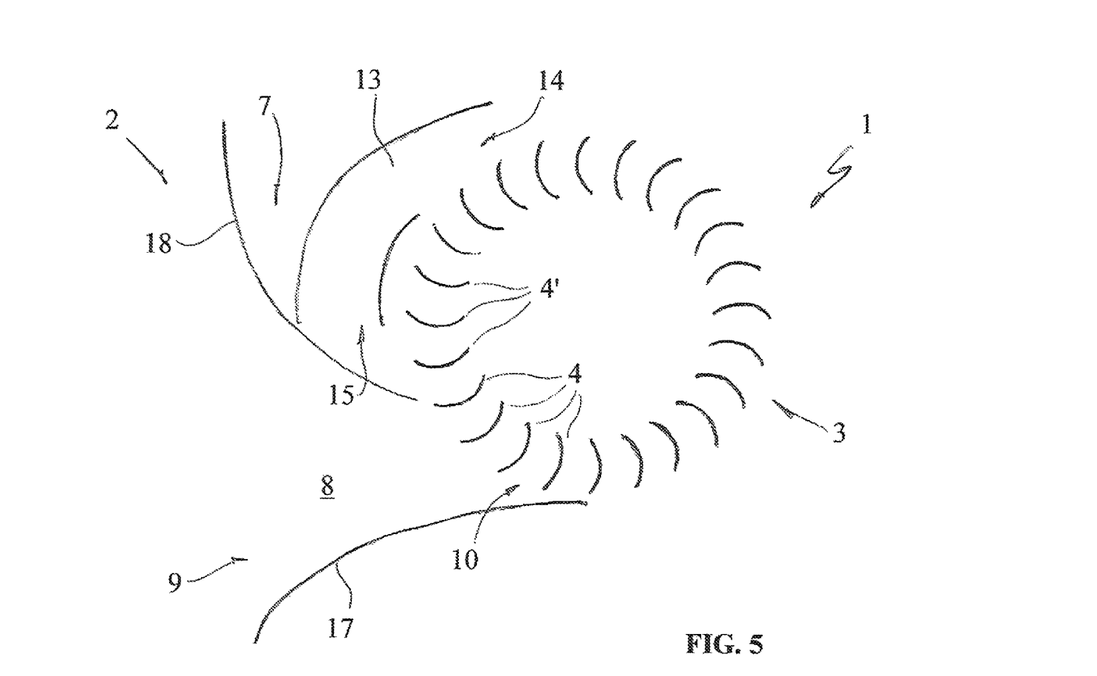
FIG. 5 is a schematic cross-sectional view of a turbine in a second preferred embodiment.

FIG. 5 shows a third configuration of a turbine 1 according to the invention which has a further configuration of the impeller 3 formed by a plurality of blades 4, 4', 4" with a convex profile and a relatively small diameter to have reduced friction in the advancing step and wherein the main conveying duct 8 has a relatively narrow outlet port 10 on the load-bearing part of the blade 4 in the pushing position to increase significantly the speed of the flow.

Figure 6:
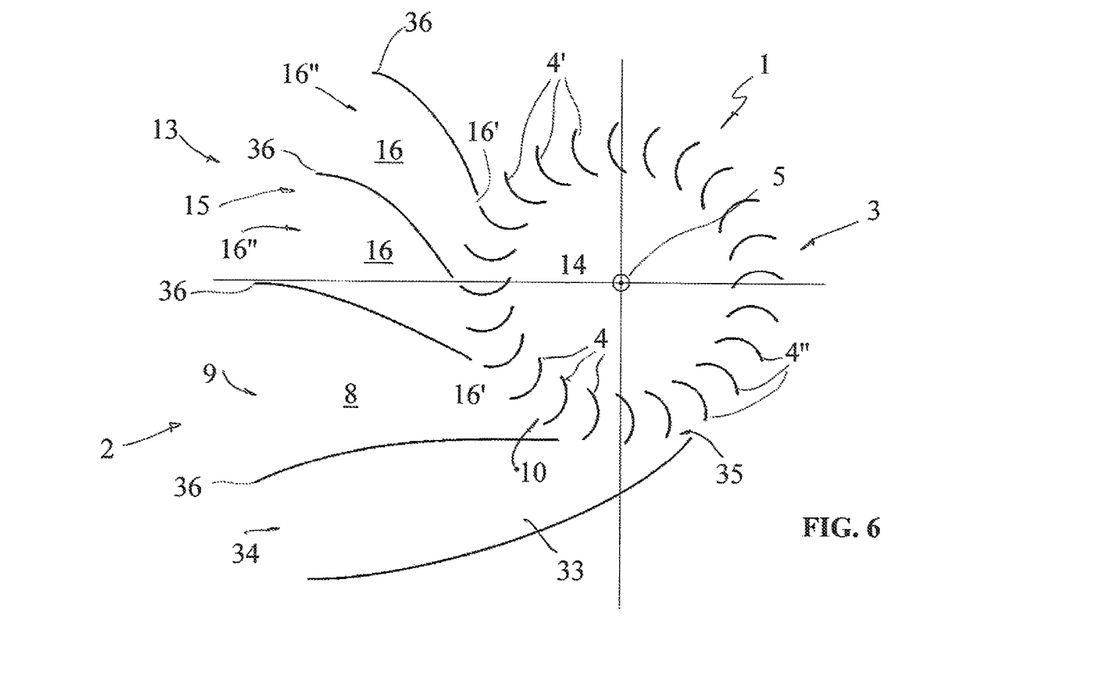
FIG. 6 is a schematic cross-sectional view of a turbine in a third preferred embodiment.

FIG. 6 shows a fourth configuration of the turbine 1 wherein the auxiliary diverter 13 is adapted to intercept the main flow and to allow it to enter the ducts 16 to send it from the second curvilinear section 15 to the blades 4' in the advancing position through the first section 14 and the first open ends 16' of the curvilinear conduits 16.

There is also a side conveying duct 33 placed opposite to the auxiliary diverter 13 relative to the main diverter 2 and having an inlet 34 substantially close to the input section of the main conveying duct 8 and an outlet 35 facing to further blades 4" in advancing position and in particular to the blades 4" moving away from the pushing position.

The conveying ducts 8, 16 are sized so that the respective inlet edges 36 for the flow have a distance relative to the axis of rotation R which decreases in the direction going from the main conveying duct 8 to the outer curved conduit 16.

In this way each conveying conduit 16 may exploit the effect of speed increase of the flow that is generated in correspondence with the input edges 36.

Figure 7:
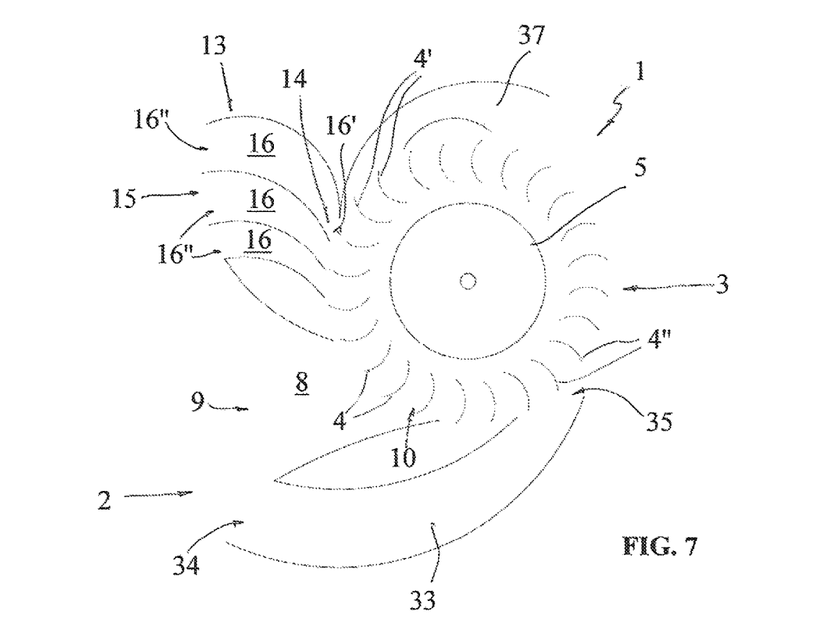
FIG. 7 is a schematic cross-sectional view of a first variant of the turbine of FIG. 6.

FIG. 7 shows a first variant of this last configuration in which a lateral return conduit 37 adapted to receive the flow produced by the rear blades 4'" is diametrically opposite to the side conveying duct 33 to channel it toward the blades 4' in the advancing position. The input edges 36 are shown with non decreasing distances but may still be configured as shown in FIG. 6.

Figure 8:
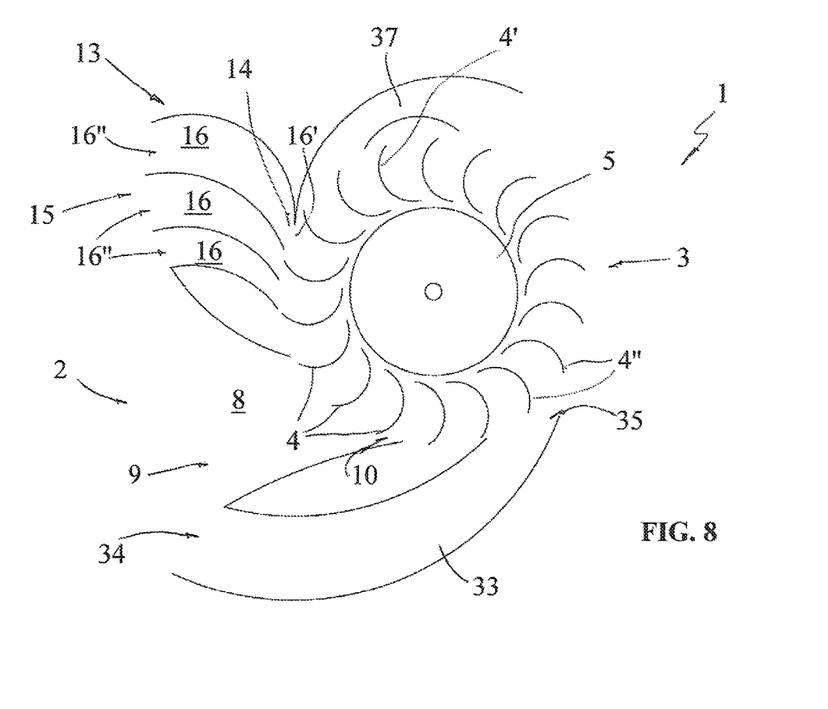
FIG. 8 is a schematic cross-sectional view of a second variant of the turbine of FIG. 6.

FIG. 8 shows a variant of FIG. 7 which essentially differs for a greater radius of curvature of the blades 4, 4'.

Figure 9:
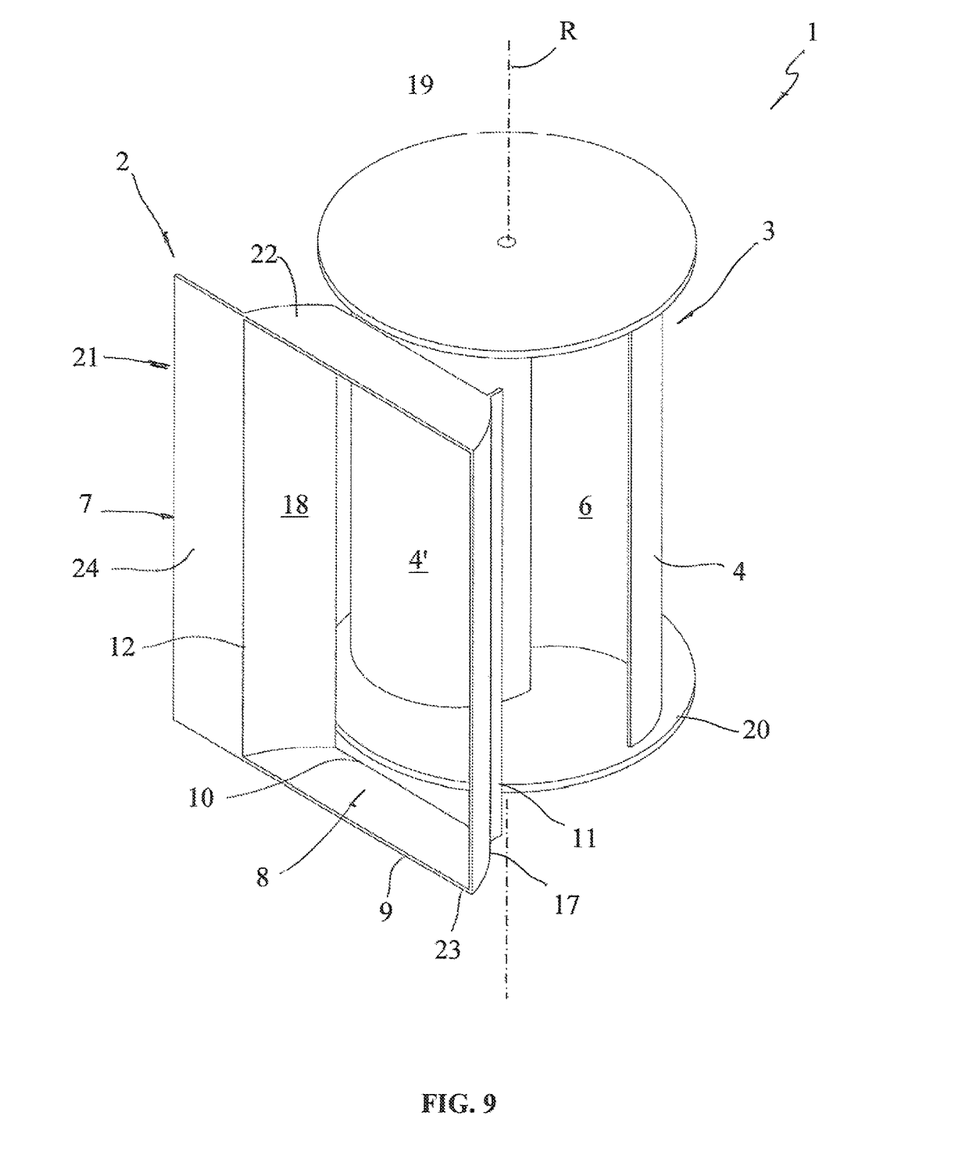
FIG. 9 is a schematic cross-sectional view of a turbine of the invention in a fourth preferred embodiment.

FIG. 9 shows in a partial way a fifth configuration of the turbine 1 according to the invention provided with an impeller 3, which in the figure is of the Helical Savonius type but which may also be different, and of the flow diverter 2 for which the auxiliary diverter 13 is not shown.

In this figure it is also noted that the impeller 3 is closed at the axial ends by an upper disc 19 and by a lower disc 20 which will connect the impeller 3 to the support frame.

In particular, in this configuration, as well as in the configuration of FIG. 1, the diverter 2 may be or not equipped with the auxiliary diverter 13, as the particular configuration of the conveyor duct 8 will still allow to obtain an advantageous effect of increase of torque because the compression zones of the fluid on the side deflection walls 17, 18 will be reduced also obtaining the above-mentioned pulling effect on the advancing blade 4'.

In this figure the conveying duct 8 is provided with an anchoring frame 21 having an upper transverse element 22 and a lower transverse element 23 substantially planar for the rigid connection of the two deflection side walls 17, 18.

Figure 10:
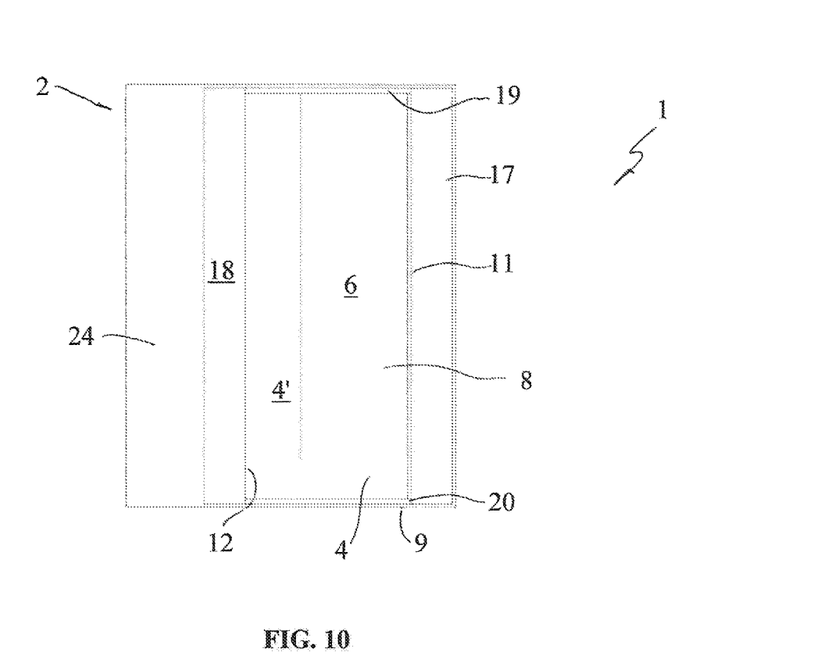
FIG. 10 is a front view of the turbine of FIG. 9.
Figure 11:
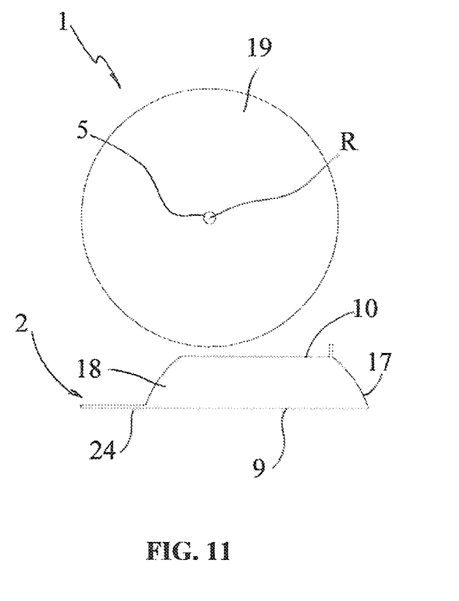
FIG. 11 is a top view of the turbine of FIG. 9.
Figure 12:
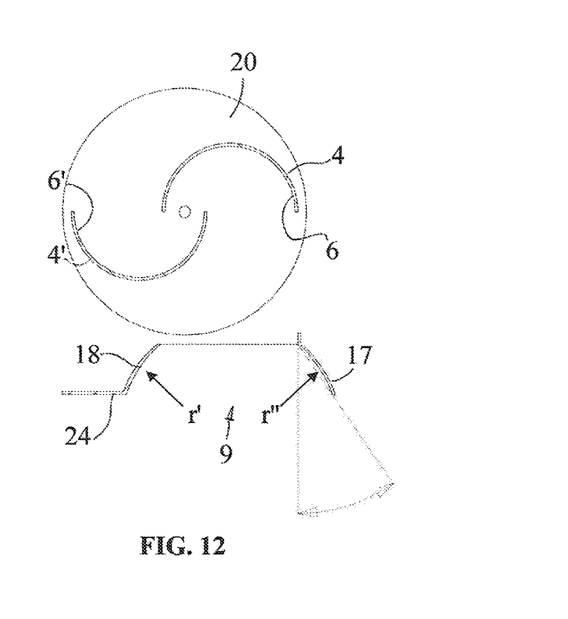
FIG. 12 is a cross-sectional view of the turbine of FIG. 9.

Also in this case the second side wall 18 will be sized so as to uncover at least part of the blade 4' in the advancing position along the inlet direction of the fluid toward the impeller 3, as can be observed from FIG. 10, and even more clearly in FIGS. 11 and 12.

From these last figures it is also noted that the two deflecting walls 17, 18 are substantially concave with a relatively high radius of curvature r', r" to avoid compression zones.

The second deflection wall 18 also presents a front appendix 24 whose aim is to shield the rear part of the advancing blade 4' from the flow.

Also in this case the diverter 2 may be connected directly to the frame of the turbine 1 or to an external support structure by means of fixed or rotatably connecting means.

Figure 13:
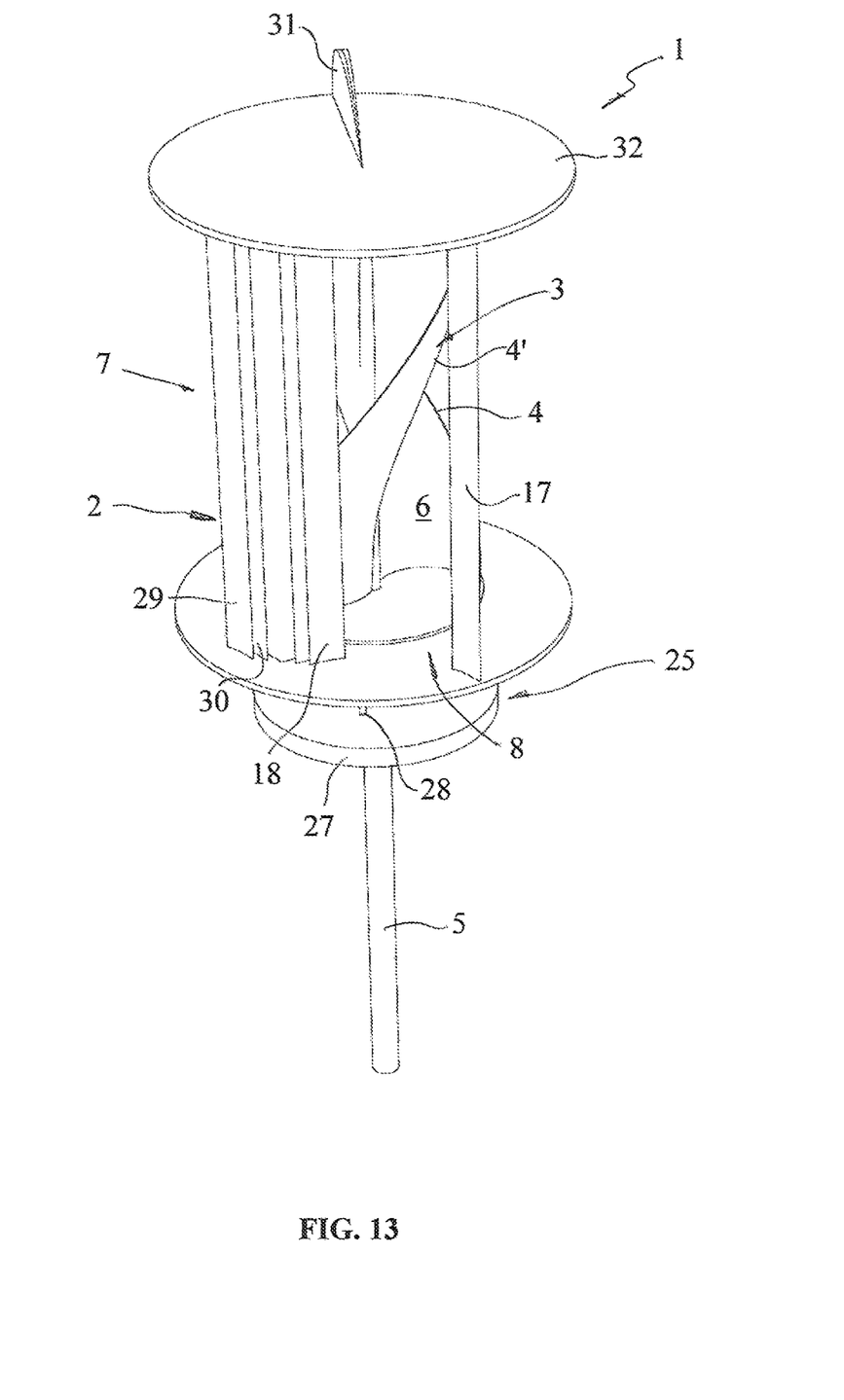
FIG. 13 is a perspective view of a turbine provided with a flow diverter according to a fifth preferred embodiment.

FIG. 13 shows a sixth configuration of the turbine 1 provided with diverter 2 which may comprise or less, as in the figure, the auxiliary diverter 13.

In this figures it is shown with more detail the frame 21 for the anchoring of the diverter 2 to the frame 25 of the turbine 1, which frame 25 will be provided with the axial rod 5 that connects the lower disc 20 to the shaft of a generator, not visible from the figure, for transforming the kinetic energy into electrical energy.

By way of example, the connecting means 27 will be of the rotary type, for example with roller bearings, ball or similar, which will allow the rotatably mounting on the stem of the support 5.

Furthermore, below the lower disc 20 an anchoring cage 28 will be arranged and provided with the aforesaid connecting hearing means 27 and which, with the diverter 2 mounted, will be placed peripherally to the generator, so as to leave it always accessible for any maintenance operation.

Further, in this configuration, the conveying duct 8 will house thereinside a plurality of deflection elements 29 each having a laminar or profiled body with a respective airfoil and at least partially overlapping each other and radially staggered.

The main task of these additional laminar or profiled bodies 29 will be to divert the current lines and slow the flow directed towards the blade 4' in the advancing position to reduce the static pressure of the flow acting thereon and consequently increase the total torque.

According to the shown configuration, the laminar bodies 29 will be substantially similar to each other, with respective sections each having an airfoil with a concave outer edge and a convex inner edge.

It is also noted that one of the laminar bodies 29 will have a pair of concave outer edges cusp-joined and an inner plane edge, so that each outer edge is arranged in a position parallel to a corresponding outer edge of the two adjacent laminar bodies to create respective air ejection channels 30, which in a configuration not shown may possibly be placed in fluid communication with the conveying duct 8 to return the fluid rejected by the advancing blade 4' back to the pushing blade 4.

The frame 21 will also include an airfoil 31 for orientation and stabilization of the flow integral with an upper disc-shaped wall 32 which joins the deflection walls 17, 18 in such a position as not to be invested by the flow generated by the impeller 3.

The primary function of the airfoil 31 will be to promote the rotation of the diverter 2 according to the main direction of fluid flow so as to align the inlet port 9 therewith, maintaining axially aligned, so as to maximize the effect of increase of the speed of the flow impacting on the blade 4 in the pushing position.

Besides this function comparable to that of a rudder, the airfoil 31 will have the function of producing a moment opposite to the moment produced by the laminar bodies 29 on the framework 21 to oppose to the rotation thereof and keep the inlet port 9 stable in correspondence of the main direction of the flow.

The airfoil 31 will be shaped to have not null incidence with respect to the flow when the frame 21 is in equilibrium condition, for example with an angle ranging between 5° and 45° with respect of the main direction of the flow, allowing the diverter 2 to be orientated so as to keep always in axis with the main direction of the flow.

Of course, different configurations are possible for the airfoil 31, which for example may be a hinged body of windmill type.

In addition, a brake may be provided, not shown, whose function will be to limit the angular speed of the diverter 2 in such a way to not make it rotate in an uncontrolled manner, avoiding high-frequency oscillations in the case of gusts and reducing the structural loads acting on the diverter itself.

The diverter 2 as described in the various configurations may be applied to any wind turbine with vertical axis, through appropriate adjustments of its configuration, which, however, will be essentially structural and do not modify the operation nor the essential elements for the definition of the scope of protection of the present invention.

The diverter 2 according to the present invention may equally be mounted on any turbine, not necessarily a wind turbine, and possibly arranged to operate with liquids or other gaseous fluids.

Of course, in the case where the turbine has not vertical axis or not is a wind turbine, the diverter 2 will still be designed to be arranged so as to at least partially envelop the impeller 3 thereof with the respective axes of rotation C, R substantially parallel with each other and its operation will be equivalent to that described above.

From above it appears evident that the turbine and the flow diverter according to the invention reach the intended object and in particular allow an increase of the maximum spin number of the turbine up to speed, while reducing the minimum speed of the fluid current required for the starter.

The diverter and the turbine according to the invention are susceptible of numerous modifications and variations, all falling within the inventive concept expressed in the attached claims. All the details may be replaced with other technically equivalent elements, and the materials may be different according to requirements, without departing from the scope of the present invention.

Even if the diverter and the turbine have been described with particular reference to the attached figures, reference numbers used in the description and in the claims are used to improve the intelligence of the invention and do not constitute any limitation the claimed scope.

The invention claimed is:

1. A turbine (1) with flow diverter (2) for a flow of operating fluid, comprising:
   a support frame (25) adapted to be anchored to a fixed or movable structure;
   an impeller (3) rotatably mounted about a rotation axis (R) to said support frame (25) and having a front inlet section for receiving the flow and a plurality of blades (4, 4', 4", . . .) adapted to move continuously upon the rotation produced by the flow between a pushing position and an advancing position in correspondence of said front inlet section;
   a main flow diverter (2) adapted to be anchored to said support frame (25) and having a peripheral wall (7) adapted to at least partially blind said front section with respect to the flow;
   an auxiliary diverter (13) extending from a first section (14) facing one or more blades (4') of said plurality in said advancing position to a second section (15) facing different one or more blades (4) of said plurality in said pushing position;
   characterized in that said auxiliary diverter (13) comprises a plurality of curvilinear conduits (16) in reciprocal side by side position along a radial direction, each of said conduits (16) having a first opened end (16') facing the one or more blades (4') of said plurality in the advancing position and a second opened end (16", 16''') placed in correspondence of a conveying duct (8).

2. Turbine as claimed in claim 1, characterized in that each of said curvilinear conduits (16) are adapted to at least partially return the operating fluid from said first inlet section (14) back to said second output section (15) to allow the entering of the flow returning from the advancing blades (4') through said first ends (16') and the feeding thereof toward said pushing blades (4) through said second ends (16") to increase the torque produced by the flow on said impeller (3).

3. Turbine as claimed in claim 2, characterized in that said main flow diverter (2) comprises the main conveying duct (8) for the operating fluid having a flow inlet port (9) and a flow outlet port (10) facing one or more blades (4) of said plurality in said pushing position.

4. Turbine as claimed claim 1, characterized in that said conveying duct (8) converges toward said flow outlet port (10) to narrow the passage of the flow toward said impeller (3) and increase the speed of the fluid.

5. Turbine as claimed in claim 4, characterized in that said conveying duct (8) comprises a planar or concave first deflection side wall (17) and a second deflection side wall (18) facing said first side wall (17).

6. Turbine as claimed in claim 5, characterized in that said second side wall (18) has a convexity outwardly or inwardly directed with an outlet edge (12) radially staggered and decentered with respect of said rotation axis (R) to allow the inlet fluid to at least partially hit also one or more blades (4') in the return position.

7. Turbine as claimed in claim 6, characterized in that said second section (15) is in fluidic communication with said conveying duct (8).

8. Turbine as claimed in claim 7, characterized in that said second opened end (16") of said curvilinear conduits are directly opened into said conveying duct (8).

9. Turbine as claimed in claim 6, characterized in that said plurality of curvilinear conduits (16) are adapted to allow the flow to enter from said second section (15) to be sent toward said plurality of blades (4') in the advancing position through said first section (14) and said first ends (16').

10. Turbine as claimed in claim 9, characterized in that said conduits (16) have inlet edges (36) having a distance from said axis of rotation (R) decreasing along the direction going from the conduit (16) closer to said conveying duct (8).

11. Turbine as claimed in claim 9, characterized in that said auxiliary diverter (13) comprises a return side duct (37) adapted to receive the flow produced by the rear blades (4''') to canalize it toward said blades (4') in advancing position.

12. Turbine as claimed in claim 1, characterized in that said main flow diverter (2) comprises a side conveying duct (33) opposite to said auxiliary diverter (13) with respect of said conveying duct (8) and having an outlet (35) facing respective one of the plurality of blades (4'') in advancing position.

13. Turbine as claimed in claim 12, characterized in that said main flow diverter (2) comprises an anchoring frame (21) having an upper transverse element (22) and a lower transverse element (23) for the rigid connection of said side deflection walls (17, 18) to said support frame (25), said rotatable connection means (27) being adapted to allow the rotation of said main diverter (2) about a central axis (C) coaxial with said rotation axis (R) in an independent manner with respect to the rotation of said impeller (3).

14. Turbine as claimed in claim 1, characterized in that said conveying duct (8) houses thereinside a plurality of deflecting elements (29) each having a laminar or profiled body with a corresponding wing profile, said plurality of deflecting elements (29) being at least partially overlapping and radially staggered with each other to divert the flow lines and slow down the flow direct to the one or more blades (4') of said plurality in said advancing position.

* * * * *